United States Patent
Wen et al.

(10) Patent No.: US 10,110,538 B2
(45) Date of Patent: Oct. 23, 2018

(54) METHOD AND APPARATUS FOR MESSAGE TRANSMISSION

(71) Applicant: TENCENT TECHNOLOGY (SHENZHEN) COMPANY LIMITED, Shenzhen (CN)

(72) Inventors: Yanjie Wen, Shenzhen (CN); Chuanchuan Bo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 480 days.

(21) Appl. No.: 14/831,194

(22) Filed: Aug. 20, 2015

(65) Prior Publication Data

US 2015/0358272 A1 Dec. 10, 2015

Related U.S. Application Data (63) Continuation of application No. PCT/CN2014/082973, filed on Jul. 25, 2014.

(30) Foreign Application Priority Data

Jul. 25, 2013 (CN) .......................... 2013 1 0316332

(51) Int. Cl.
G06F 15/16 (2006.01)
H04L 12/58 (2006.01)
H04L 29/08 (2006.01)

(52) U.S. Cl.
CPC ............ *H04L 51/24* (2013.01); *H04L 51/046* (2013.01); *H04L 67/025* (2013.01); *H04L 67/18* (2013.01); *H04L 67/26* (2013.01)

(58) Field of Classification Search
CPC ...... H04L 51/24; H04L 51/046; H04L 67/025
(Continued)

(56) References Cited

U.S. PATENT DOCUMENTS

2004/0225718 A1* 11/2004 Heinzel ............... G06Q 10/107
709/206
2007/0239884 A1* 10/2007 Karmakar ............... H04L 67/26
709/232

FOREIGN PATENT DOCUMENTS

CN 102047638 A 5/2011
CN 102263830 A 11/2011
(Continued)

OTHER PUBLICATIONS

The World Intellectual Property Organization (WIPO) International Search Report for PCT/CN2014/082973, dated Sep. 16, 2014.
(Continued)

*Primary Examiner* — Alan S Chou
(74) *Attorney, Agent, or Firm* — Anova Law Group, PLLC (57) ABSTRACT

A method for message transmission is provided. The method includes receiving a message to be transmitted to an application on a terminal, determining whether the application is in an inactive state, and determining whether a push notification switch of the application is turned on when it is determined that the application is in the inactive state. The method also includes, when it is determined that the push notification switch of the application is not turned on, storing temporally the message and detecting whether the application is activated and, after detecting that the application is activated, transmitting the temporally stored message to the application on the terminal. Further, the method includes transmitting the message to a push notification server to cause the push notification server to push the message to the application on the terminal when it is determined that the push notification switch of the application is turned on.

19 Claims, 6 Drawing Sheets

(58) Field of Classification Search
USPC ........................................................ 709/206
See application file for complete search history.

(56) References Cited

FOREIGN PATENT DOCUMENTS

| | | |
|---|---|---|
| CN | 103166921 A | 6/2013 |
| CN | 103188653 A | 7/2013 |
| EP | 1841130 A1 | 10/2007 |
| KR | 100695212 B1 | 3/2007 |

OTHER PUBLICATIONS

The State Intellectual Property Office of the People's Republic of China (SIPO) Office Action 1 for 201310316332.6 dated Jun. 25, 2018 8 Pages (including translation).

* cited by examiner

METHOD AND APPARATUS FOR MESSAGE TRANSMISSION

CROSS-REFERENCES TO RELATED APPLICATIONS

This application is a continuation application of PCT Patent Application No. PCT/CN2014/082973, filed on Jul. 25, 2014, which claims priority of Chinese Patent Application No. 201310316332.6, filed on Jul. 25, 2013, the entire contents of both of which are incorporated by reference herein.

FIELD OF THE INVENTION

The present invention generally relates to the field of network communication technology and, more particularly, to methods and apparatus for message transmission.

BACKGROUND

With the rapid development of terminal technologies, functions of a terminal are constantly enriched, and applications developed based on the terminal become increasingly more popular. A user may install and run a variety of applications on the terminal (e.g., mobile phones, tablet personal computers). Currently, many kinds of applications (e.g., communication applications, social networking applications) may transmit messages between the terminals. For example, an application (e.g., Tencent QQ) in a first terminal sends a message to a same application in a second terminal. The first terminal usually sends the message to a backend server. Then, the backend server transmits the message to the application in the second terminal.

For some applications which have push notification functionality, the mechanisms that the backend server transmits messages to these applications may include the followings. When the application is in an active state, because persistent connections established between the backend server and the application have characteristics of good real-time performance, the backend server usually transmits the message to the application through the persistent connections. When the application is in an inactive state (e.g., the application is closed or switched to the background), the message is sent to a push notification server and the push notification server pushes the message to the application. At the same time, a push notification is popped up. For example, applications that run in iOS devices (e.g., an iPhone, an iPod touch, an iPad) may implement a push notification function through Apple Push Notification Service (APNS) provided by Apple Inc. When the application in the iOS device is in the inactive state, the backend server may send the message to an APNS server, such that the APNS server transmits the message to the application.

However, the above mechanisms still have some defects. For example, when an application is in an inactive state, if a push notification switch is off, a backend server may lose a message because the backend server is unable to push the message through the push notification server, increasing the message loss probability. Because the message transmission is an important aspect of computer technology dealing with networked applications, technical solutions are needed to solve and/or improve the issues associated with the message transmission methods and systems.

BRIEF SUMMARY OF THE DISCLOSURE

One aspect of the present disclosure includes a method for message transmission. The method includes receiving a message to be transmitted to an application on a terminal, determining whether the application is in an inactive state, and determining whether a push notification switch of the application is turned on when it is determined that the application is in the inactive state. The method also includes, when it is determined that the push notification switch of the application is not turned on, storing temporally the message and detecting whether the application is activated and, after detecting that the application is activated, transmitting the temporally stored message to the application on the terminal. Further, the method includes transmitting the message to a push notification server to cause the push notification server to push the message to the application on the terminal when it is determined that the push notification switch of the application is turned on.

Another aspect of the present disclosure includes a message transmission apparatus. The apparatus includes one or more processors; memory; and a plurality of program modules stored in the memory and to be executed by the one or more processors. The plurality of program modules further include a first determination module a first determination module, a second determination module, a temporary storage module, a detecting module, and a transmitting module. The first determination module is configured to receive a message to be transmitted to an application on a terminal and to determine whether the application is in an inactive state. The second determination module is configured to, when it is determined that the application is in the inactive state, determine whether a push notification switch of the application is turned on. The temporary storage module is configured to, when it is determined that the push notification switch of the application is not turned on, temporally store the message. The detecting module is configured to detect whether the application is activated. The transmitting module configured to, after detecting that the application is activated, transmit the temporally stored message to the application on the terminal and, when it is determined that the push notification switch of the application is turned on, to transmit the message to a push notification server to cause the push notification server to push the message to the application on the terminal.

Another aspect of the present disclosure includes a message transmission system. The message transmission system includes a terminal having an application with a push notification switch, a backend server coupled with the terminal via a network, and a push notification server coupled with the backend server and the terminal to perform a push operation. The backend server is configured to receive a message to be transmitted to an application on the terminal, to determine whether the application is in an inactive state, and, when it is determined that the application is in the inactive state, to determine whether the push notification switch of the application is turned on. The backend server is also configured to, when it is determined that the push notification switch of the application is not turned on, store temporally the message and detecting whether the application is activated and, after detecting that the application is activated, to transmit the temporally stored message to the application on the terminal. Further, the backend server is configured to, when it is determined that the push notification switch of the application is turned on, transmit the message to a push notification server such that the push notification server pushes the message to the application on the terminal.

Other aspects of the present disclosure can be understood by those skilled in the art in light of the description, the claims, and the drawings of the present disclosure.

BRIEF DESCRIPTION OF THE DRAWINGS

In order to describe the technical solution of the embodiments of the present invention more clearly, drawings used in the description of the embodiments are introduced below. The drawings described below are merely some exemplary embodiments of the present invention. For those skilled in the art, on the premise of no inventive effort being involved, other drawings may also be obtained according to these drawings and the descriptions included herein.

DETAILED DESCRIPTION

In the following descriptions, for purposes of illustration, many specific details are illustrated in order to provide a full understanding of one or more embodiments. However, obviously, those embodiments can also be implemented when these specific details can be changed, replaced, or alternated. The followings, together with accompanying drawings, describe in detail certain embodiments of the present invention.

As used herein, unless otherwise specified, the term "terminal device" in this disclosure may also be referred to as "terminal".

As used herein, the term "Apple Push Notification Service (APNS)" is a service created by Apple Inc., which uses push technology through a constantly open Internet Protocol (IP) connection to forward notifications from the servers of third party applications to the Apple devices. The notifications may include badges, sounds or custom text alerts.

As used herein, the term "push notification" in this disclosure refers to an indication that can automatically be delivered to a user when a terminal receives a push message from backend servers. The term "push system" in this disclosure refers to an overall end-to-end software/hardware system for implementing a push notification function that allows backend servers to deliver push messages to users.

Figure 1:
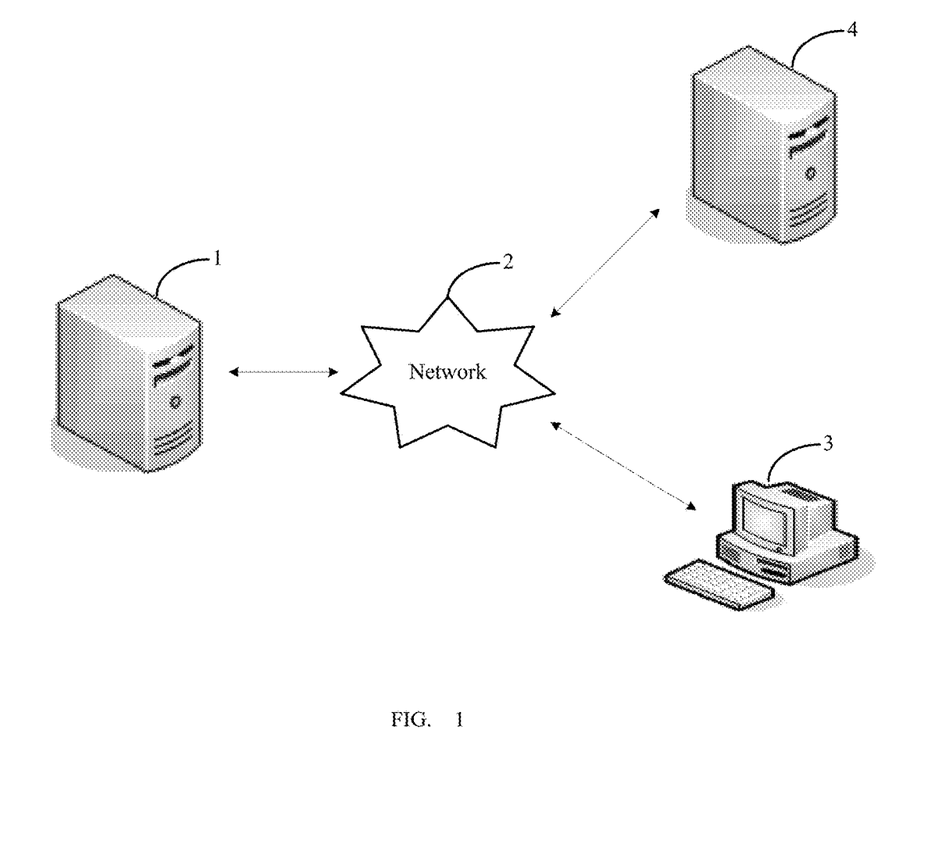
FIG. 1 shows an environment for implementing a message transmission process consistent with the disclosed embodiments.

FIG. 1 shows an environment for implementing a message transmission process consistent with the disclosed embodiments. As shown in FIG. 1, the environment may include at least one backend server 1, a network 2, at least one terminal 3, and at least one push notification server 4. Other components may also be included.

The message transmission process can be implemented on the backend server 1, push notification server 4, and/or terminal 3. The backend server 1 communicates with the terminal 3 and the push notification server 4 through the network 2 for certain personalized services provided by the backend server 1. The terminal 3 may also communicate with the push notification server 4 through the network 2.

Although only one backend server 1 and one push notification server 4 are shown in the environment, any number of backend server 1 or push notification server 4 may be included, and other devices may also be included. Of course, the backend server 1 or the push notification server 4 may also be virtual cloud computing module.

The terminal 3, as used herein, may refer to any appropriate user terminal with certain computing capabilities. The terminal 3 may include, but are not limited to, personal computers (PCs), portable computers, mobile phones, tablet PCs, personal digital assistants (PDAs), or other similar operation devices. The terminal 3 may be implemented on any appropriate computing platform.

The network 2 may include any appropriate type of communication network for providing network connections to the terminal 3, backend server 1 and push notification server 4 or among multiple terminal devices 3, backend server 1, and push notification server 4. For example, the network 2 may include the Internet or other types of computer networks or telecommunication networks (e.g., a 2G, 3G network provided by telecom carriers), either wired or wireless.

The backend server, as used herein, may refer to one or more server computers configured to provide certain web server functionalities for message transmission. The backend server may also include one or more processors to execute computer programs in parallel.

Figure 6:
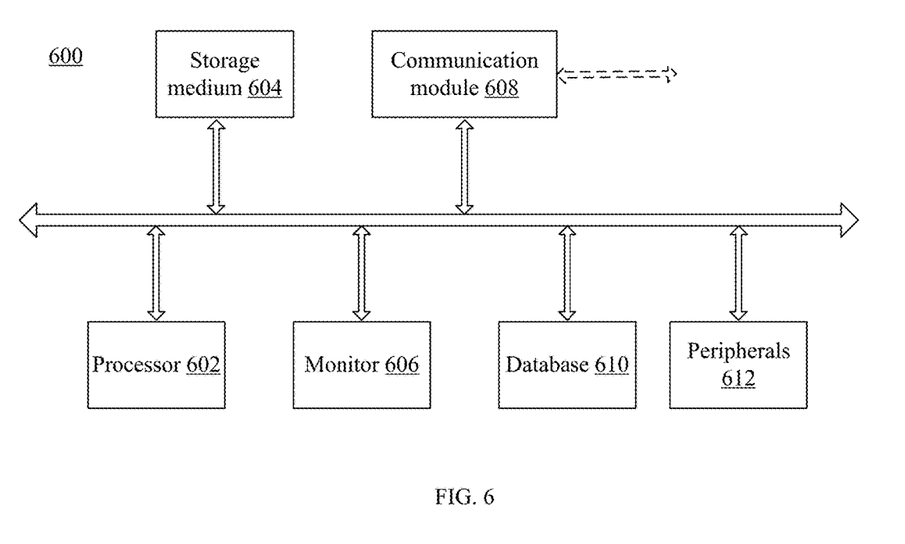
FIG. 6 shows a block diagram illustrating an exemplary computing system consistent with the disclosed embodiments.

FIG. 6 shows a block diagram illustrating an exemplary computing system capable of implementing the backend server 1, push notification server 4, and/or terminal 3. As shown in FIG. 6, the exemplary computer system 600 may include one or more processors 602, a storage medium 604, a monitor 606, a communication module 608, a database 610, peripherals 612, and one or more bus 614 to couple the devices together. Certain devices may be omitted and other devices may be included.

The processor 602 can include any appropriate processor or processors. Further, the processor 602 can include multiple cores for multi-thread or parallel processing. For example, the processor 602 may generate a message transmission process. The storage medium 604 may include memory modules, such as ROM, RAM, and flash memory modules, and mass storages, such as CD-ROM, U-disk, removable hard disk, etc. The storage medium 604 may store computer programs (e.g., a browser) for implementing various processes, when executed by the processor 602.

The monitor 606 may include display devices for displaying information. For example, the monitor 606 of the terminal 3 can be used by a user to display browser windows, webpage contents, etc. The communication module 608 may include network devices for establishing connections through the communication network 2. The database 610 may include one or more databases for storing certain data and for performing certain operations on the stored data. Further, the peripherals 612 may include I/O devices such as keyboard and mouse.

In various embodiments, a terminal such as a user-side electronic device involved in the disclosed embodiments can include the terminal 3.

Figure 2:
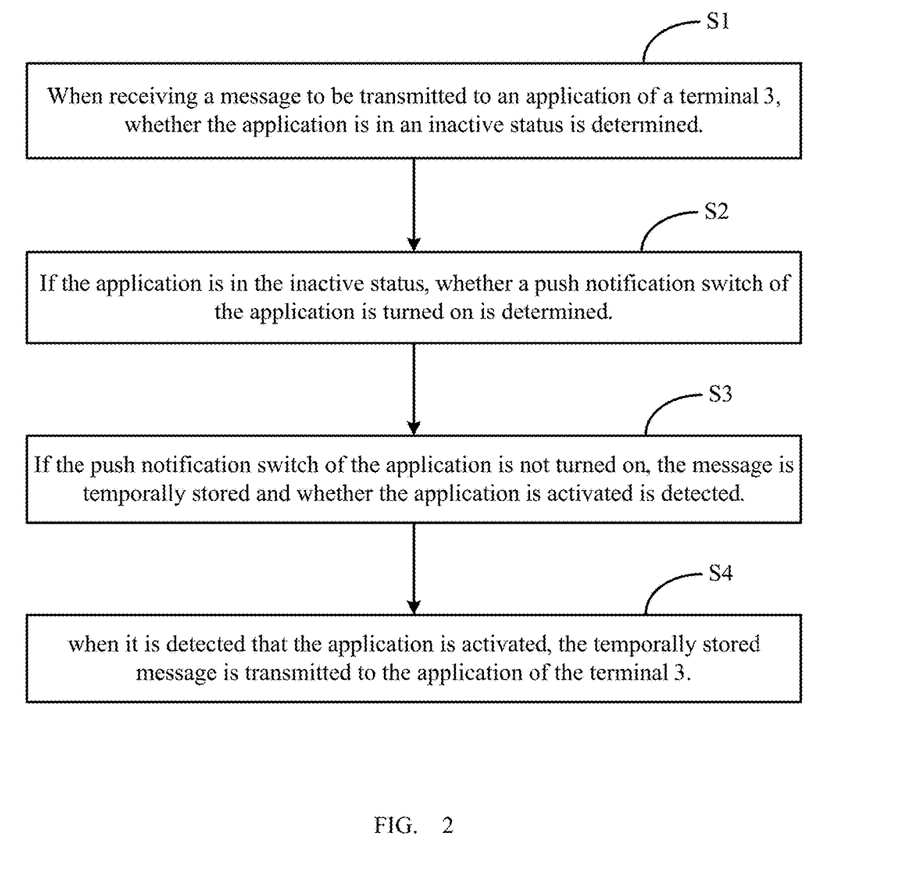
FIG. 2 illustrates a flow chart of an exemplary process for message transmission consistent with the disclosed embodiments.

FIG. 2 illustrates a flow chart of an exemplary process for message transmission consistent with the disclosed embodiments. The message transmission process may apply to any appropriate user terminal with certain computing capabilities, such as a smartphone (e.g., an Android mobile phone, an iOS mobile phone, etc.), a Tablet personal computer (PC), a Pocket PC, a Mobile Internet Device (MID) and a Personal Access Device (PAD), or any other user-side computing device.

As shown in FIG. 2, the process may include the following steps.

Step S1: when receiving a message to be transmitted to an application on the terminal 3, determining whether the application is in an inactive state.

In certain embodiments, the application described in S1 may be a communication application including any instant messaging application (e.g., QQ, Skype, etc.) or social networking application (e.g., Renren network, Q-zone, etc.). The backend of the application is set up on the backend server 1, whereas the frontend of the application may be installed and run respectively in multiple terminal devices, such as the terminal 3. The application on the terminal 3 may also be referred as the frontend of the application that runs on the terminal 3.

In certain embodiments, the message to be transmitted to the application on the terminal 3 is from the same type application on any other terminal. The message transmission between the application on the terminal 3 and the application on any other terminal needs to be transmitted through the backend server 1. After logging in the backend server 1 through a valid login account, the application on any other terminal sends a message transmission request to the backend server 1, requesting the backend server 1 to transmit the message to the application on the terminal 3. In addition to the message, the message transmission request also includes an identification of the application on the terminal 3, such as a current login account (e.g., a QQ account) of the application on the terminal 3.

After receiving the message to be transmitted to the terminal 3, whether the application on the terminal 3 is in the inactive state is determined (Step S1). The inactive state of the application means that the application is turned off or switched to the background. The inactive state can be determined by any appropriate means. In certain embodiments, whether a persistent connection with the application is disconnected is also determined. If the persistent connection with the application is disconnected, it is determined that the application is in the inactive state.

The persistent connection may be any appropriate communication connection between the terminal 3 and the backend server 1 that can last for a substantial amount of time without being disconnected, such as a TCP (transmission control protocol) long connection or an HTTP (Hypertext transfer protocol) keep-alive connection, etc.

When the application on the terminal 3 is activated (switch to an active state), for example, when the application is clicked and started by a user, the application sends registration information to the backend server 1. The registration information may include a login account, a device identifier, etc. The device identifier may be a MAC (Media Access Control) address of a network card of the terminal 3. The device identifier is used to ensure that the backend server 1 can locate to the terminal 3. After the backend server 1 receives the registration information, the backend server verifies the validity of the login account of the user/application on the terminal 3. If the login account is valid, the backend server 1 establishes the persistent connection with the application on the terminal 3.

When the application is in the active state, if the application does not exchange data packet with the backend server 1, the application and the backend server 1 may constantly send link detecting packets to detect whether the persistent connection is disconnected. If the persistent connection is disconnected, the backend server 1 immediately re-establishes the persistent connection with the application on the terminal 3 to keep the persistent connection.

When the application is deactivated (for example, the application is clicked and turned off by a user), the persistent connection between the application and the backend server 1 is disconnected. Therefore, in Step S1, whether the application is in the inactive state may be determined by determining whether the persistent connection between the backend server 1 and the application is disconnected. If the persistent connection with the application is disconnected, it is determined that the application is in the inactive state. If the persistent connection with the application is not disconnected, it is determined that the application is not in the inactive state, that is, in the active state. Thus, the message can be transmitted to the application on the terminal 3 through the persistent connection.

Step S2: if the application is in the inactive state, whether a push notification switch of the application is turned on is determined.

The push notification switch of the application is used to open or close the push notification function of the application. The push notification function implemented by a push system means, when the application is in the inactive state and the push notification switch is turned on, the backend server 1 may push the message to the application on the terminal 3 through the push notification server 4. For example, if the terminal is an iOS device (e.g., an iPhone, an iPod touch, an iPad) that is equipped with a mobile operating system (iOS) developed by Apple Inc., the push notification server 4 may be an Apple Push Notification Service (APNS) server provided by Apple Inc.

When the push notification switch of the application on the terminal 3 is turned on, the terminal 3 may establish an encrypted connection with the push notification server 4. Specifically, the terminal 3 has a unique device certificate, and the push notification server 4 also has a unique device certificate. When the terminal 3 establishes the encrypted connection with the push notification server 4, the terminal 3 and the push notification server 4 may verify the validity of each other's certificate. If the verification is valid, the encrypted connection is established successfully and the push notification server 4 generates a push token based on the device certificate of the terminal 3 and a token key. Then, the push notification server 4 returns the push token to the terminal 3.

When the application is activated, if the push notification switch is turned on, the registration information sent to the backend server 1 by the application may also include the push token. When the application is activated, if the push notification switch is not turned on, the encrypted connection between the terminal 3 and the push notification server 4 is not established and the terminal 3 cannot obtain the push token. The registration information does not include the push token.

After the backend server 1 receives the registration information, the backend server checks whether the registration information includes the push token. Status records of the push notification switch of the application may record "on" or "off" status of the push notification switch. If the registration information includes the push token, status records of the push notification switch of the application is updated to "on". If the registration information does not include the push token, the status records of the push notification switch of the application is updated to "off". It is understood that the status records of the push notification switch of the application can only indicate the push notification switch status at the time when the application is activated. The status records of the push notification switch may be stored in the backend server 1.

Therefore, in S2, if the application is in the inactive state, at the beginning, the status records of the push notification switch of the application can be read. Then, based on the status records, whether the push notification switch is turned on is determined. If it is determined that the push notification switch is turned on, the message and the push token together may be transmitted to the push notification server 4. Further, the push notification server 4 locates the terminal 3 based on the push token, and pushes the message to the application on the terminal 3.

Step S3: if the push notification switch of the application is not turned on, the message is temporally stored and whether the application is activated is detected.

When the application on the terminal 3 is in the inactive state, if the push notification switch of the application is not turned on, the message to be transmitted is temporally stored. Then, when the application is activated, the message is transmitted to the application, thus reducing the message loss rate and improving the reliability of message transmission.

More specifically, if the push notification switch is not turned on, it means that the backend server 1 cannot push the message to the application on the terminal 3 through the push notification server 4, and the backend server 1 stores the message temporally without losing the message. At the same time, the backend server 1 keeps detecting whether the application is activated.

As described above, in Step S3, whether the persistent connection is established between the backend server 1 and the application is detected. If it is detected that the persistent connection is established between the backend server 1 and the application, it is determined that the application is activated. It should be understood, when detecting that the application is activated, in Step S3, the backend server can also receive the registration information sent by the application, checks whether the registration information includes the push token, and updates the status records of the push notification switch of the application based on whether the registration information includes the push token. If the registration information includes the push token, the status records of the push notification switch of the application is updated to "on". If the registration information does not include the push token, the status records of the push notification switch of the application is updated to "off".

Figure 7:
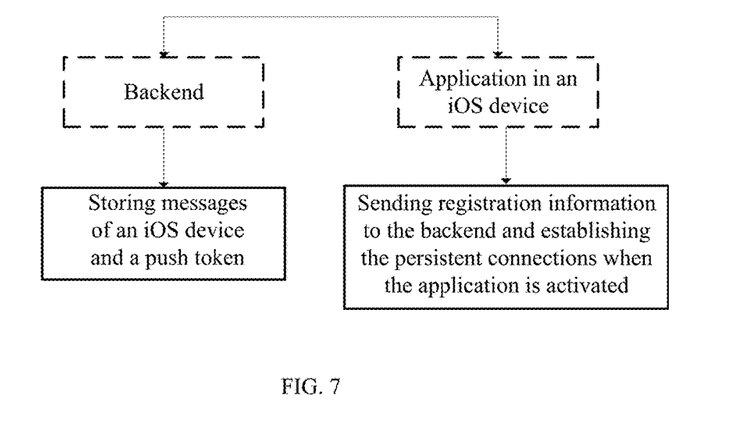
FIG. 7 illustrates an exemplary process for message transmission consistent with the disclosed embodiments.

When the terminal is an iOS device, FIG. 7 illustrates a structure diagram of an exemplary process for message transmission. As shown in FIG. 7, at the beginning, an application in an iOS device sends registration information (e.g., a login account, a device identifier, a push token, etc.) to a backend. A device identifier is used to ensure that the backend can locate to the iOS device. At the same time, the application in the iOS device may also receive push notifications sent from the backend. If the push notification switch is not turned on, the backend stores messages temporally without losing the messages. At the same time, the backend keeps detecting whether the application is activated. When the backend detects that the application is in an activate status, the backend establishes persistent connections with the application.

Returning to FIG. 2 and in Step S4: when it is detected that the application is activated, the temporally stored message is transmitted to the application on the terminal 3.

When detecting that the application is activated, the temporally stored message is transmitted to the application on the terminal 3 through the persistent connection between the backend server 1 and the application.

It should be noted that, if it is determined that the push notification switch is not turned on and the message is temporally stored, in the process when it is not detected that the application is activated, even though the push notification switch of the application is turned on, the terminal 3 establishes the encrypted connection with the push notification server 4 and obtains the push token. Because the persistent connection between the backend server 1 and the application is not detected, and the registration information sent from the application is not received, the status records of the push notification switch of the application cannot be updated. Therefore, the backend server 1 still determines that the push notification of the application is not turned on, and the message cannot be pushed to the application on the terminal 3 through the push notification server 4.

Figure 3:
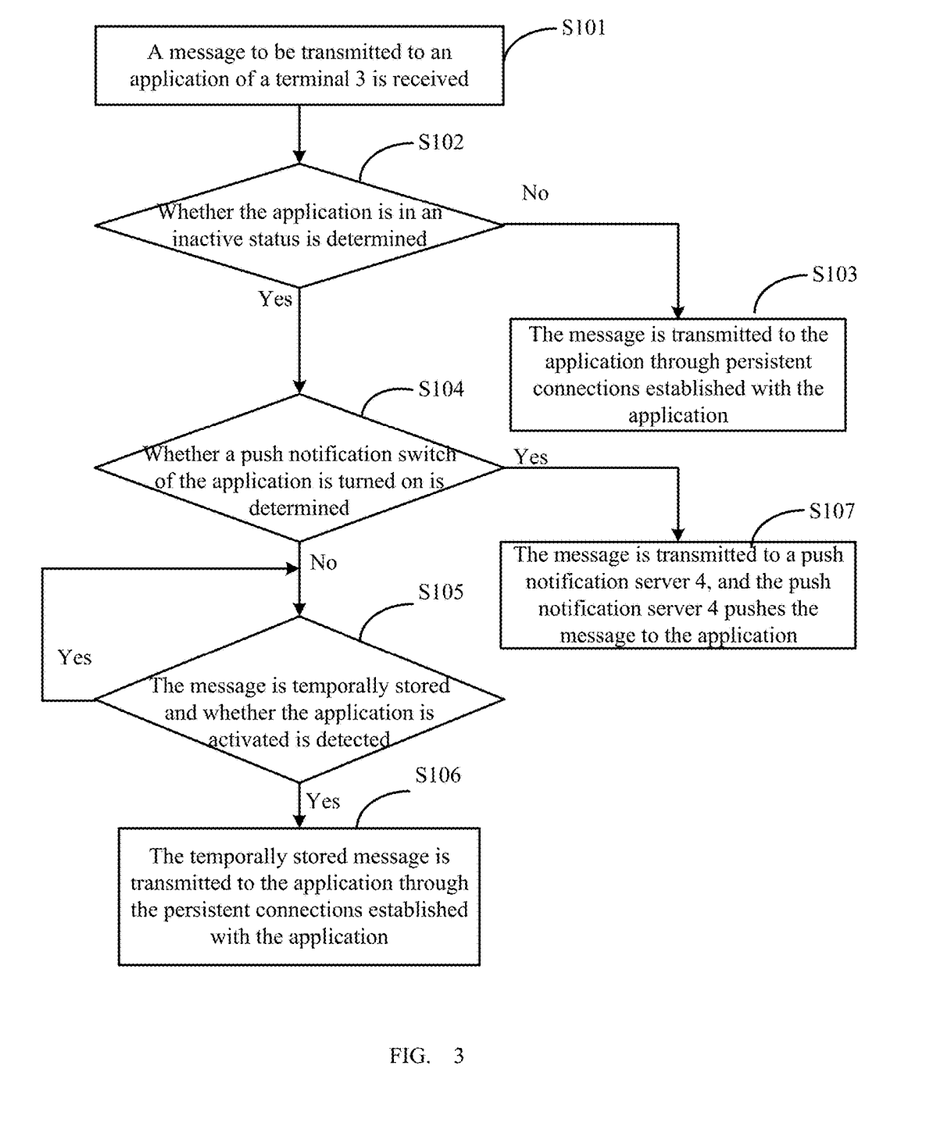
FIG. 3 illustrates a flow chart of an exemplary process that a backend server transmits a message to an application of a terminal consistent with the disclosed embodiments.

FIG. 3 illustrates a flow chart of an exemplary process that a backend server 1 transmits a message to an application on the terminal 3 consistent with the disclosed embodiments. As shown in FIG. 3, the process may include the following steps.

S101: a message to be transmitted to an application on the terminal 3 is received.

S102: whether the application is in an inactive state is determined. If the application is not in the inactive state, the process goes to S103. If the application is in the inactive state, the process goes to S104.

S103: the message is transmitted to the application through a persistent connection established between the server 1 and the application on terminal 3.

S104: whether a push notification switch of the application is turned on is determined. If the push notification switch of the application is not turned on, the process goes to S105. If the push notification switch of the application is turned on, the process goes to S107.

S105: the message is temporally stored and whether the application is activated is detected. If the application is activated, the process goes to S106. If the application is not activated, the process repeats S105.

S106: the temporally stored message is transmitted to the application through the persistent connection established with the application.

S107: the message is transmitted to a push notification server 4, and the push notification server 4 pushes the message to the application.

Figure 4:
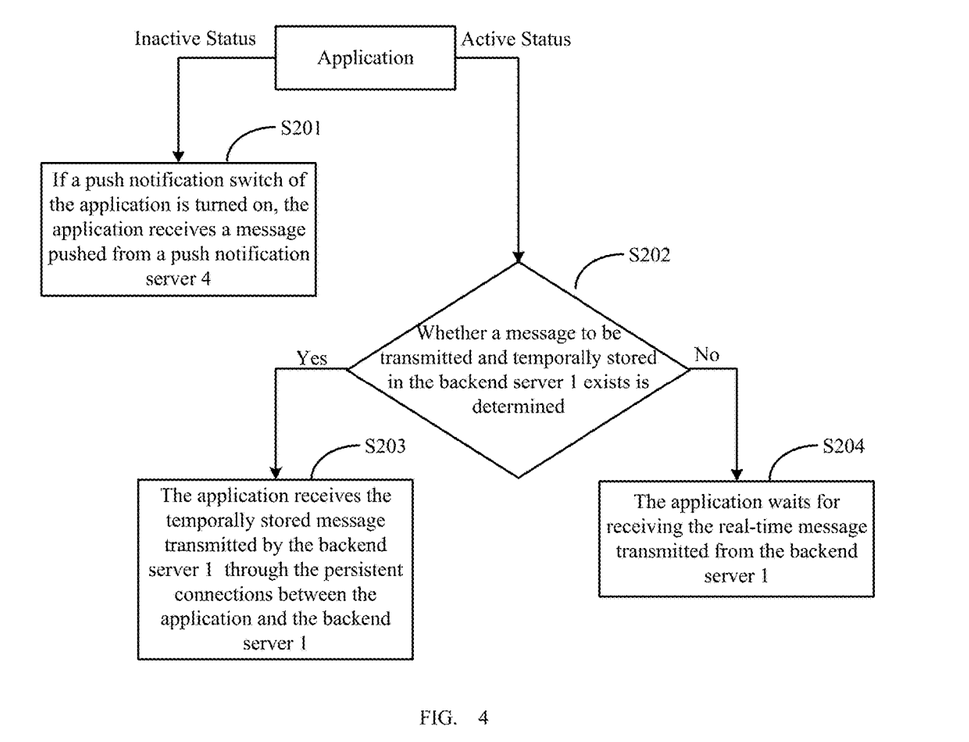
FIG. 4 illustrates a flow chart of an exemplary process that an application receives a message transmitted by a backend server consistent with the disclosed embodiments.

FIG. 4 illustrates a flow chart of an exemplary process that an application of a terminal receives a message transmitted by a backend server consistent with the disclosed embodiments. As shown in FIG. 4, the process may include the following steps:

At the beginning, if the application is in an inactive state, the process goes to S201.

S201: if a push notification switch of the application is turned on, the application receives a message pushed from a push notification server 4 as in S107 in FIG. 3.

If the application is in an active state and the application establishes persistent connections with a backend server 1, the process goes to S202.

S202: whether a message to be transmitted and temporally stored in the backend server 1 exists is determined. If the message to be transmitted and temporally stored in the backend server 1 exists, the process goes to S203. If the message to be transmitted and temporally stored in the backend server 1 does not exist, the process goes to S204.

S203: the application receives the temporally stored message transmitted by the backend server 1 as in S106 in FIG. 3 through the persistent connection between the application and the backend server 1.

S204: the application waits for receiving the real-time message transmitted from the backend server 1.

Figure 5:
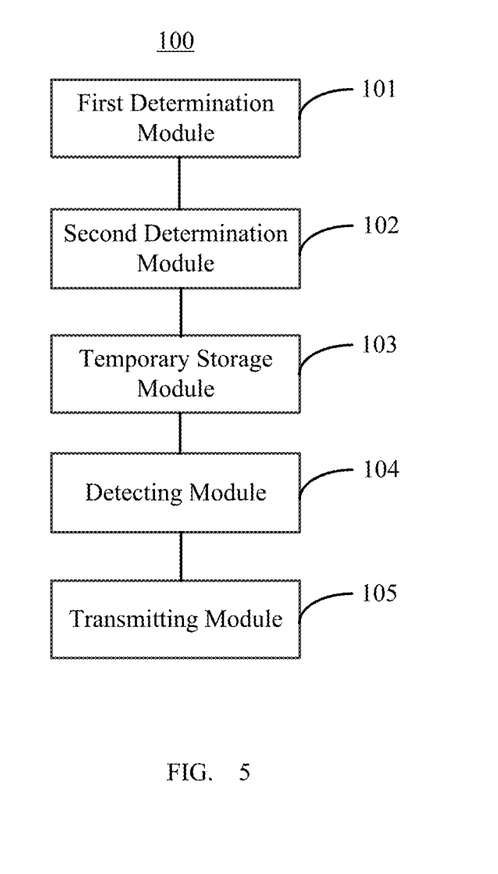
FIG. 5 illustrates a structure diagram of an exemplary apparatus for message transmission consistent with the disclosed embodiments.

FIG. 5 illustrates a structure diagram of an exemplary apparatus for message transmission consistent with the disclosed embodiments. As shown in FIG. 5, the apparatus may include a first determination module 101, a second determination module 102, a temporary storage module 103, a detecting module 104, and a transmitting module 105. It is understood that each modules may refer to a computer program or a program segment for executing one or more specific functions and/or corresponding hardware platform for such execution. That is, also referring to FIG. 6, the apparatus may include at least one or more processor, memory, and a plurality of program modules stored in the memory and to be executed by the one or more processors. The plurality of program modules further comprise first determination module 101, second determination module 102, temporary storage module 103, detecting module 104, and transmitting module 105, etc. Further, the above various modules do not mean the corresponding computer program code also needs to be separated. Alternatively, the various modules (first determination module 101, second determination module 102, temporary storage module 103, detecting module 104, and transmitting module 105, etc.) may be considered as a combination of the processor and the memory supporting and being configured by the computer program stored in the memory when executed by the processor.

The first determination module 101 is configured to, when receiving a message to be transmitted to an application on the terminal 3, determine whether the application is in an inactive state. Specifically, the first determination module 101 may determine whether a persistent connection with the application is disconnected. If the persistent connection is disconnected, it is determined that the application is in the inactive state. If the persistent connection is not disconnected, it is determined that the application is not in the inactive state, and the message is transmitted to the application on the terminal 3 through the persistent connection with the application.

The second determination module 102 is configured to, when the application is in the inactive state, determine whether a push notification switch of the application is turned on. The second determination module 102 may read status records of the push notification of the application and determine whether the push notification switch of the application is turned on based on the status records. If the second determination module 102 determines that the push notification switch of the application is turned on, the message is transmitted to a push notification server 4, and the push notification server 4 pushes the message to the application on the terminal 3.

The temporary storage module 103 is configured to, when the push notification switch of the application is not turned on, temporally store the message to-be-transmitted.

Further, the detecting module 104 is configured to detect whether the application is activated. Specifically, the detecting module 104 may detect whether the persistent connection is established with the application. If the persistent connection is established with the application, it is determined that the application is activated.

It should be noted that the detecting module 104 may detect whether the application is activated at any time, which is not limited to when push notification of the application is not turned on and the message is temporally stored. The detecting module 104 may continue detecting whether the application is activated when the application is in the inactive state. When detecting that the application is activated, the detecting module 104 also receives registration information sent from the application, and updates the status records of the push notification switch of the application based on the registration information.

The transmitting module 105 is configured to, when the detecting module 104 detects that the application is activated, transmit the temporally stored message to the application on the terminal 3. The transmitting module 105 transmits the temporally stored message to the application on the terminal through the persistent connections with the application.

Each functional module in the embodiments of the present invention may be integrated into a processing module, or may be a separate physical module. The above integrated modules may be implemented with hardware, or software function modules. Each module of the above apparatuses may execute the described message transmission methods in the method embodiments, which are not repeated herein.

By using the disclosed apparatuses for message transmission, when the application on the terminal 3 is in the inactive state and the push notification switch is not turned on, the message transmission apparatus 100 temporally stores the message to be transmitted to the application. When the application is activated, the message transmission apparatus transmits the message to the application, thereby decreasing message loss rate and improving the reliability of the message transmission.

The respective embodiments in the disclosure are described in a stepwise manner, the same or similar parts between the respective embodiments can be referred to with each other, and the emphasized explanations of the respective embodiments are the difference from other embodiments. Especially, for the apparatus embodiments, since they are substantially similar to the method embodiments, the description is comparatively simple, and relevant part can be referred to the explanation of the part of the method embodiments.

Those skilled in the art may implement the described functionality in varying ways for each particular application, but such implementation decisions should not be interpreted as being a departure from the scope of the present invention.

Those skilled in the art should understand that all or part of the steps in the above method may be executed by relevant hardware instructed by a program, and the program may be stored in a computer-readable storage medium such as a removable hard disk, a read-only memory (ROM), a random access memory (RAM), a magnetic disk, an optical disk, and so on.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and apparatuses for message transmission, when receiving a message to be transmitted to an application on a terminal, whether the application is in an inactive state is determined. If the application is in the inactive state, whether a push notification switch of the application is turned on is determined. When an application of a terminal is in an inactive state and a push notification switch is not turned on, a message transmission apparatus temporally stores the message to be transmitted to the application. When the application is activated, the message transmission apparatus transmits the message to the application, thereby decreasing message loss rate and improving the reliability of the message transmission.

What is claimed is:

1. A message transmission method, comprising:
    transmitting, by a terminal, a registration information of an application to a backend server for verification, the registration information including a login account and a device identifier of the terminal;
    when the login account is verified, establishing, by the backend server, a persistent connection with the application on the terminal;
    establishing an encrypted connection between the terminal and a push notification server, and verifying the device identifier of the terminal and a device identifier of the push notification server;
    when the encrypted connection between the terminal and the push notification server is established, generating a push token by the push notification server;
    receiving a message to be transmitted to the application on the terminal;
    determining whether the application is in an inactive state;
    when it is determined that the application is in the inactive state, determining whether a push notification switch of the application is turned on by determining whether the registration information sent to the backend server by the application includes the push token;
    when it is determined that the push notification switch of the application is not turned on, storing temporally the message and detecting whether the application is activated and, after detecting that the application is activated, transmitting the temporally stored message to the application on the terminal; and
    when it is determined that the push notification switch of the application is turned on, transmitting the message to a push notification server to cause the push notification server to push the message to the application on the terminal.

2. The method according to claim 1, wherein determining whether the application is in an inactive state further includes:
    determining whether a persistent connection with the application is disconnected; and
    when the persistent connection with the application is disconnected, determining that the application is in the inactive state.

3. The method according to claim 2, wherein detecting whether the application is activated further includes:
    detecting whether a persistent connection is established with the application; and
    when detecting that persistent connection with the application is established, determining that the application is activated.

4. The method according to claim 3, further including:
    when detecting that the application is activated, receiving registration information sent from the application; and
    based on the registration information, updating status records of the push notification switch of the application, wherein the status records of the push notification switch record on and off status of the push notification switch.

5. The method according to claim 4, wherein determining whether a push notification switch of the application is turned on further includes:
    reading the status records of the push notification switch of the application; and
    based on the status records, determining whether the push notification switch of the application is turned on.

6. The method according to claim 3, wherein transmitting the temporally stored message to the application on the terminal when detecting that the application is activated further includes:
    transmitting the temporally stored message to the application on the terminal through the persistent connection with the application.

7. The method according to claim 3, after determining whether the application is in an inactive state, further including:
    when the application is not in the inactive state, transmitting the message to the application on the terminal through the persistent connection with the application.

8. A message transmission apparatus, comprising:
    one or more processors;
    memory; and
    a plurality of program modules stored in the memory and to be executed by the one or more processors, the plurality of program modules further comprising:
        a first determination module configured to receive a message to be transmitted to an application on a terminal and to determine whether the application is in an inactive state;
        a second determination module configured to, when it is determined that the application is in the inactive state, determine whether a push notification switch of the application is turned on by determining whether a registration information sent to a backend server by the application includes a push token, wherein:
            the registration information of the application is transmitted to the backend server from a terminal for verification, the registration information including a login account and a device identifier of the terminal;
            when the login account is verified, the backend server establishes a persistent connection with the application on the terminal;
            an encrypted connection between the terminal and a push notification server is established, and the device identifier of the terminal and a device identifier of the push notification server is verified; and
            when the encrypted connection between the terminal and the push notification server is established, the push token is generated by the push notification server;
        a temporary storage module configured to, when it is determined that the push notification switch of the application is not turned on, temporally store the message;

a detecting module configured to detect whether the application is activated; and a transmitting module configured to, after detecting that the application is activated, transmit the temporally stored message to the application on the terminal and, when it is determined that the push notification switch of the application is turned on, to transmit the message to a push notification server to cause the push notification server to push the message to the application on the terminal.

9. The apparatus according to claim 8, wherein the first determination module is further configured to:

determine whether a persistent connection with the application is disconnected; and when the persistent connection with the application is disconnected, determine that the application is in the inactive state.

10. The apparatus according to claim 9, wherein the detecting module is further configured to:

detect whether persistent connection is established with the application; and when the persistent connection is established with the application, determine that the application is activated.

11. The apparatus according to claim 10, wherein the detecting module is further configured to:

when detecting that the application is activated, receive registration information sent from the application; and based on the registration information, update status records of the push notification switch of the application.

12. The apparatus according to claim 11, wherein the second determination module is further configured to:

read the status records of the push notification switch of the application; and based on the status records, determine whether the push notification switch is turned on.

13. The apparatus according to claim 9, wherein the transmitting module is further configured to:

transmit the temporally stored message to the application on the terminal through the persistent connection with the application.

14. The apparatus according to claim 9, wherein the first determination module is further configured to:

when the application is not in the inactive state, transmit the message to the application on the terminal through the persistent connection with the application.

15. A message transmission system, comprising:

a terminal having an application with a push notification switch;

a backend server coupled with the terminal via a network; and a push notification server coupled with the backend server and the terminal to perform a push operation, wherein the backend server is configured to:

receive a registration information of an application to from the terminal for verification, the registration information including a login account and a device identifier of the terminal;

when the login account is verified, establish a persistent connection with the application on the terminal;

receive a message to be transmitted to the application on the terminal;

determine whether the application is in an inactive state;

when it is determined that the application is in the inactive state, determine whether the push notification switch of the application is turned on by determining whether the registration information sent to the backend server by the application includes a push token;

when it is determined that the push notification switch of the application is not turned on, store temporally the message and detecting whether the application is activated and, after detecting that the application is activated, to transmit the temporally stored message to the application on the terminal; and when it is determined that the push notification switch of the application is turned on, transmit the message to a push notification server such that the push notification server pushes the message to the application on the terminal;

wherein the push notification server is configured to:

establish an encrypted connection between the terminal and the push notification server, and verify the device identifier of the terminal and a device identifier of the push notification server; and when the encrypted connection between the terminal and the push notification server is established, generate the push token.

16. The system according to claim 15, wherein the backend server is further configured to:

determine whether a persistent connection with the application is disconnected; and when the persistent connection with the application is disconnected, determine that the application is in the inactive state.

17. The system according to claim 16, wherein the backend server is further configured to:

detect whether a persistent connection is established with the application; and when it is detected that persistent connection with the application is established, determine that the application is activated.

18. The system according to claim 17, wherein the backend server is further configured to:

when it is detected that the application is activated, receive registration information sent from the application; and based on the registration information, update status records of the push notification switch of the application, wherein the status records of the push notification switch record on and off status of the push notification switch.

19. The system according to claim 17, wherein the backend server is further configured to:

when the application is not in the inactive state, transmit the message or the temporally stored message to the application on the terminal through the persistent connection with the application.

* * * * *